United States Patent Office 3,567,747
Patented Mar. 2, 1971

3,567,747
SULFUR CONTAINING FATTY ACID DERIVATIVES AND PROCESS FOR THE PREPARATION OF SAME
Gordon G. Moore, Willow Grove, and Edward S. Rothman, Philadelphia, Pa., assignors to the United States of America as represented by the Secretary of Agriculture
No Drawing. Filed Nov. 19, 1968, Ser. No. 777,169
Int. Cl. C07c 143/90
U.S. Cl. 260—399
14 Claims

ABSTRACT OF THE DISCLOSURE

Sulfur containing fatty acid derivatives are prepared by reacting at a temperature range of from 70 to 200° C. the isopropenyl ester of a fatty acid containing from 14 to 18 carbon atoms with a mercaptan, a thiophenol, a thiol acid or a sulfonamide.

---

A non-exclusive, irrevocable, royalty-free license in the invention herein described, throughout the world for all purposes of the United State Government, with the power to grant sublicenses for such purposes, is hereby granted to the Government of the United States of America.

This invention relates to a novel preparation of sulfur containing fatty acid derivatives. More particularly, it relates to the reaction of the enol ester isopropenyl stearate and the isopropenyl esters of other fatty acids and mixtures of fatty acids with compounds containing sulfur or a sulfhydryl group to prepare fatty acid derivatives that are useful as lubricants. The preparation of isopropenyl stearate by ester-acid interchange is described in J. Org. Chem. 27, 3123–27, 1962, and its preparation by direct addition is described in J.A.O.C.S. 45, 189–193, 1968.

An object of this invention is to provide a novel process for preparing sulfur containing fatty acid derivatives.

In general, according to this invention the isopropenyl ester of fatty acids containing from 14 to 18 carbon atoms is reacted at a temperature range of from 70 to 200° C. with a compound containing sulfur or a sulfhydryl group. The product is then purified by recrystallization or a combination of recrystallization and other purification means.

Although the homologous compounds allyl stearate and vinyl stearate appear to be very similar structurally to isopropenyl stearate, they are completely ineffective and cannot be used to obtain the desired results. The driving force for the acylation reaction of this invention is the liberation of acetone vapor from the isopropenyl stearate.

In the prime reaction between isopropenyl stearate and the sulfur containing compound a trace of acid catalyst is required when the reacting sulfur containing compound is not sufficiently acidic to catalyze the reaction. Sulfonic acids such as methane-sulfonic or p-toluenesulfonic acid in amounts of about 0.5 to 1.0% by weight are preferred as catalysts but mineral acids such as sulfuric, phosphoric and perchloric acids are also effective.

The general reaction is illustrated below with a sulfhydryl containing compound:

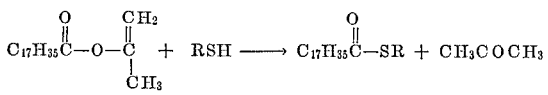

where R represents an alkyl from 4 to 12 carbon atoms, a phenyl or a benzyl.

The optimum temperatures required for the reaction are in the range between about 70 to 200° C. In the case of the SH reactant compound thiol acetic acid, the first (proximate) product is a geminal diester I which is unstable and evolves acetone to form a mixed anhydride II, which is also unstable and disproportionates to the unmixed anhydride III.

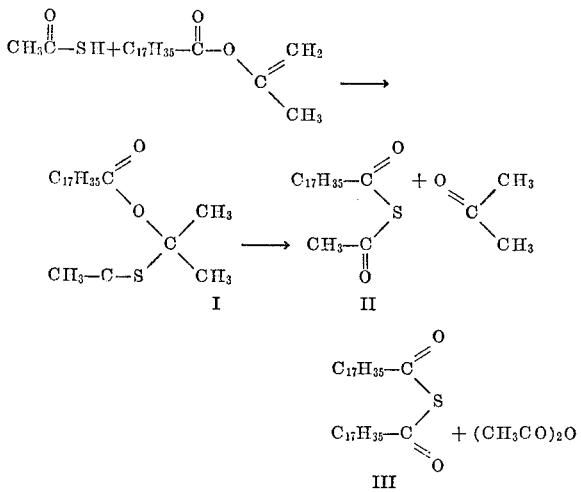

For the sake of simplicity, isopropenyl stearate has been used as the reactive reagent. However, similarly useful for the purposes of the reaction are the isopropenyl esters of oleic acid, palmitic acid, margaric acid and mixtures of naturally occurring acids derived from the saponification of lard, tallow or vegetable oils.

The novelty of this process is that it succeeds where more common ester reagents are incapable of producing the desired compound. Thus Sasin et al. (J. Org. Chem. 22, 1183–4, 1957) attempted the preparation of dodecyl thiolstearate by reacting methyl stearate, dodecyl thiol and sodium methoxide at 250° C. for 25 hrs. without obtaining a trace of dodecyl thiolstrearate. The only solid material that Sasin et al. isolated was unchanged methyl stearate.

In the present process we obtained an 85% yield in five minutes reaction time at 125° C. The following examples are shown to exemplify the reaction and are not intended to have a limiting effect on the scope of the reaction.

EXAMPLE 1

Dodecyl thiostearate: To 10.0 g. (0.0308 mole) of isopropenyl stearate heated to 125° C. on an oil bath was added 9.8 g. (0.049 mole) of 1-dodecanethiol followed by 2 drops of methanesulfonic acid. Acetone was liberated immediately. After heating five minutes the reaction product was taken up in a mixture of hot methylene chloride and hexane and poured rapidly through a 20 cm. Florisil column using vacuum to elute the material rapidly. The product was recrystallized from hexane to give 12.0 g. (85%) of dodecyl thiostearate, M.P. 56–57° C.

EXAMPLE 2

Benzyl thiostearate: To 7.9 g. of isopropenyl stearate heated to 120° C. was added 3.2 g. of benzyl mercaptan and 2 drops of methanesulfonic acid. After heating for 30 minutes the product was recrystallized from hexane or ether to give 7.9 g. (80%) of benzyl thiostearate, M.P. 60.5–61.5° C.

EXAMPLE 3

Isobutyl thiostearate: To 10 g. of isopropenyl stearate heated to 95° C. was added 3.6 g. of isobutyl mercaptan and 5 drops of methanesulfonic acid. After heating for 10 minutes the product was chromatographed on Florisil with pentane to give 10.3 g. (67%) of isobutyl thiostearate, M.P. 22–23° without further purification.

EXAMPLE 4

Phenyl thiostearate: To 10 g. of isopropenyl stearate at 110° C. was added 2.8 g. of benzenethiol and 3 drops of methanesulfonic acid. After heating for 30 minutes the product was recrystallized from hexane to give 8.1 g. (70%) of phenyl thiostearate, M.P. 38.0 to 39.5° C.

EXAMPLE 5

Stearic thioanhydride: To 8.6 g. of isopropenyl stearate at 130° C. was added 2.0 g. of thiolacetic acid and two drops of methanesulfonic acid. After heating for one hour the product was purified by recrystallization from hexane or chromatography on Florisil to give nearly a quantitative yield of stearic thioanhydride, M.P. 81.0-81.8° C.

*Analysis.*—Calcd. for $C_{36}H_{70}O_2S$ (percent): S, 5.66. Found (percent): S, 5.52. I.R. 1713 cm.$^{-1}$ (VS), 1766 cm.$^{-1}$ (m.).

EXAMPLE 6

N-benzyl-N-stearoyl-p-toluenesulfonamide: To a melt of N - benzyl - p - toluenesulfonamide (1.20 g., 0.00487 mole) and isopropenyl stearate (1.25 g., 0.00387 mole) was added about 3 mg. of p-toluenesulfonic acid. The product was recrystallized from hexane and ethanol to give 1.31 g. (64%) of N-benzyl-N-stearoyl-p-toluenesulfonamide: M.P. 65.0-65.8°; I.R. ($CH_2Cl_2$) 1700 cm.$^{-1}$ (C=O).

*Analysis.*—Calcd. for $C_{32}H_{49}NO_3S$ (percent): C, 72.82; H, 9.36; N, 2.65; S, 6.08. Found (percent): C, 72.81; H, 9.44; N, 2.56; S, 6.28.

EXAMPLE 7

N,N'-distearoylsulfanilamide: To a melt of sulfanilamide (1.00 g., 0.00581 mole) and isopropenyl stearate (6.00 g., 0.0185 mole) at 200° was added about 3 mg. of p-toluenesulfonic acid. After heating the mixture for 10 minutes, the product was washed with ether and recrystallized from ethanol to give 3.2 g. (80%) of N,N'-distearoylsulfanilamide: M.P. 135-8°; I.R. (Nujol) 1707 and 1674 cm.$^{-1}$.

*Analysis.*—Calcd. for $C_{42}H_{76}N_2O_4S$ (percent): C, 71.55; H, 11.26; S, 4.55. Found (percent): C, 71.85; H, 11.26; S, 4.16.

EXAMPLE 8

N-stearoyl - p - toluenesulfonamide: To isopropenyl stearate (2.00 g., 0.00617 mole) and p-toluenesulfonamide (1.00 g., 0.00584 mole) at 150° was added about 3 mg. of p-toluenesulfonic acid. Acetone is immediately liberated. After heating for 5 minutes the product was recrystallized from hexane to give 2.04 g. (80%) of N-stearoyl-p-toluenesulfonamide: M.P. 97.0-97.2° [lit. 98-99°]; I.R. ($CH_2Cl_2$) 1728 (C=O).

*Analysis.*—Calcd. for $C_{25}H_{43}NO_3S$ (percent): C, 68.60; H, 9.90; N, 3.20; S, 7.33. Found (percent): C, 68.51; H, 10.10; N, 3.04; S, 7.90.

EXAMPLE 9

N-phenyl-N-stearoyl-p-toluenesulfonamide: To a melt of N-phenyl-p - toluenesulfonamide (1.20 g., 0.00486 mole) and isopropenyl stearate (1.60 g., 0.0494 mole) at 150° was added 3 mg. of p-toluenesulfonic acid. After heating the reaction for 7 minutes at 150-200°, the product was recrystallized from hexane to give 2.10 g. (85%) of N - phenyl-N-stearoyl-p-toluenesulfonamide: M.P. 107.5-108.5°; I.R. ($CH_2Cl_2$) 1708 cm.$^{-1}$ (C=O).

*Analysis.*—Calcd. for $C_{31}H_{47}NO_3S$ (percent): C, 72.47; H, 9.22; S, 6.30. Found (percent): C, 72.76; H, 9.45; S, 6.30.

We claim:
1. A process for the preparation of a sulfur-containing fatty acid derivative comprising reacting an isopropenyl ester of a fatty acid containing from 14 to 18 carbon atoms with a compound containing sulfur or a sulfhydryl group at a temperature of about from 70° C. to 200° C.

2. The process of claim 1 wherein the isopropenyl ester of a fatty acid containing from 14 to 18 carbon atoms is isopropenyl stearate.

3. The process of claim 1 wherein the isopropenyl ester of a fatty acid containing from 14 to 18 carbon atoms is isopropenyl stearate and the compound reacted therewith contains sulfur.

4. The process of claim 3 wherein the sulfur-containing compound is benzenethiol.

5. The process of claim 3 wherein the sulfur-containing compound is thiolacetic acid.

6. The process of claim 3 wherein the sulfur-containing compound is N-benzyl-p-toluenesulfonamide.

7. The process of claim 3 wherein the sulfur-containing compound is sulfanilamide.

8. The process of claim 3 wherein the sulfur-containing compound is p-toluenesulfonamide.

9. The process of claim 3 wherein the sulfur-containing compound is N-phenyl-p-toluenesulfonamide.

10. The process of claim 1 wherein the isoprenyl ester of a fatty acid containing from 14 to 18 carbon atoms is isopropenyl stearate and the compound recited therewith contains a sulhydryl group.

11. The process of claim 10 wherein the sulfhydryl group-containing compound is 1-dodecanethiol.

12. The process of claim 10 wherein the sulfhydryl group-containing compound is benzyl mercaptan.

13. The process of claim 10 wherein the sulfhydryl group-containing compound is isobtuyl mercaptan.

14. A compound selected from the group consisting of N - benzyl - N - stearoyl-p-toluenesulfonamide, N,N'-distearoyl sulfanilamide, N - stearoyl - p - toluene-sulfonamide, and N - phenyl - N-stearoyl-p-toluenesulfonamide.

References Cited

UNITED STATES PATENTS 3,033,882  5/1962  Joullie et al. _____ 260—398

ELBERT L. ROBERTS, Primary Examiner

U.S. Cl. X.R.

260—401